United States Patent
Norin et al.

(10) Patent No.: US 6,463,282 B2
(45) Date of Patent: Oct. 8, 2002

(54) NON-UNIFORM MULTI-BEAM SATELLITE COMMUNICATIONS SYSTEM AND METHOD

(75) Inventors: John L. Norin, Los Angeles, CA (US); Sudhakar Rao, Torrance, CA (US); Paul Regulinski, Los Angeles, CA (US); Romulo Pontual, Pacific Palisades, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/835,536

(22) Filed: Apr. 16, 2001

(65) Prior Publication Data

US 2001/0036826 A1 Nov. 1, 2001

Related U.S. Application Data

(63) Continuation of application No. 09/160,681, filed on Sep. 25, 1998.
(60) Provisional application No. 60/062,004, filed on Oct. 17, 1997.

(51) Int. Cl.$^7$ .......................... H04Q 7/20; H04B 7/185; H01Q 13/00; H01Q 19/06
(52) U.S. Cl. ...................... 455/429; 455/12.1; 455/13.1; 455/427; 342/354; 342/352; 343/753; 343/779; 343/781 P; 343/781 R
(58) Field of Search ................................ 455/429, 427, 455/444, 449, 446, 443, 13.3, 12.2, 13.2; 342/354, 353, 352; 343/753, 776, 772, 775, 777, 779, 781 P, 786, 781 R

(56) References Cited

U.S. PATENT DOCUMENTS

| | | | |
|---|---|---|---|
| 3,541,553 A | * 11/1970 | Gubin | 342/354 |
| 4,163,942 A | * 8/1979 | Acampora et al. | 455/63 |
| 4,823,341 A | 4/1989 | Rosen | 370/325 |
| 5,113,197 A | 5/1992 | Luh | 343/776 |
| 5,404,569 A | 4/1995 | Schwedeman et al. | 455/13.4 |
| 5,548,292 A | 8/1996 | Hwang et al. | 343/753 |
| 5,576,721 A | 11/1996 | Hwang et al. | 343/753 |
| 5,867,783 A | 2/1999 | Horstein et al. | 455/427 |
| 5,926,758 A | 7/1999 | Grybos et al. | 455/429 |
| 5,990,842 A | * 11/1999 | Lo Forti et al. | 343/756 |
| 5,995,832 A | 11/1999 | Mallinckrodt | 455/427 |
| 6,021,309 A | * 2/2000 | Sherman et al. | 455/12.1 |
| 6,032,041 A | 2/2000 | Wainfan et al. | 455/427 |
| 6,067,453 A | 5/2000 | Adiwoso et al. | 455/430 |
| 6,173,178 B1 | * 1/2001 | Hammill et al. | 455/429 |

FOREIGN PATENT DOCUMENTS

JP 360033745 3/1985 ................ 455/13.3

OTHER PUBLICATIONS

Adatia et al., Multi Coverage Shaped Reflector Antenna Designs, from Antennas and Propagation Society International Symposium, 1989. AP–S Digest, 1182–1186 vol. 3.

* cited by examiner

Primary Examiner—Nay Maung
Assistant Examiner—Raymond B. Persino
(74) Attorney, Agent, or Firm—Koppel, Jacobs, Patrick & Heybl

(57) ABSTRACT

A satellite broadcast system and method, particularly useful for television signals, allows for local as well as nationwide broadcast service by allocating greater satellite resources to the more important local service areas. This is accomplished by broadcasting a non-uniform pattern of local service beams and designing the system to establish different service area priorities through factors such as the individual beam powers, sizes, roll-off characteristics and peak-to-edge power differentials. Frequency reuse is enhanced by permitting a certain degree of cross-beam interference, with lower levels of interference established for the more important service areas.

5 Claims, 9 Drawing Sheets

NON-UNIFORM MULTI-BEAM SATELLITE COMMUNICATIONS SYSTEM AND METHOD

This application is a continuation application Ser. No. 09/160,681 filed Sep. 25, 1998, which claims benefit of Provisional Application Serial No. 60/062,004 filed on Oct. 17, 1997.

BACKGROUND OF THE INVENTION

1. Field of the Invention

This invention relates to satellite communication systems and methods, and more particularly to the broadcast of signals on a local area basis with some of the signal frequency bands repeated for different areas.

2. Description of the Related -Art

Cable television systems have been used to provide local television service, with the programming content differing from one service area to the next, in addition to nation-wide program distribution in which all areas receive the same national programming. While satellite broadcasting has also been successfully used for nation-wide broadcasts, local area service has proven more difficult to achieve because of interference between signals intended for different service areas that have different program content. In the past, satellite broadcasts have been limited to a generally uniform large regional coverage, such as the entire United States, without the inclusion of local service broadcasts.

"Spot" broadcast beams, which are smaller than regional beams, have been used previously for non-television satellite broadcasting, such as telephone applications. Two types of spot beam broadcasts have been employed. In one, illustrated in FIG. 1, a desired region 10 such as a country is covered by a uniform grid of evenly spaced spot beams 12 having equal sizes and output power levels. To assure complete area coverage, adjacent beam spots are over-lapped. Different and non-overlapping frequency bands are assigned to the signals within each pair of adjacent beams to prevent cross-beam signal interference. In the simplified illustration of FIG. 1, four different frequency bands are employed (designated #1, #2, #3 and #4), with each beam separated from the next closest beam with the same frequency band by at least one other beam having a different frequency band.

The uniform spot beams 12 provide a complete coverage of the desired larger regional area 10, without significant interference between beams. However, a distinct disadvantage of this approach is that the satellite's resources are evenly divided among target areas of key importance, such as high density population centers, and target areas of much lesser importance such as mountainous and other less developed areas. This can result in either an overly complex satellite system, or a system that does not provide adequate capacity to the most important target areas.

A second approach has been to broadcast different beams having signals within a common frequency band to separate target areas that are spaced far enough apart from each other to avoid significant cross-beam interference, thus allowing for a higher signal capacity to those areas that are covered. The different beams can be broadcast with different output powers, thus providing the greatest capacity for the most important target areas. However, the requirement that the beam target areas be spaced well apart from each other can result,in an inadequate overall coverage area, and the broadcast signals are limited to only a single frequency band.

Other U.S. Patents to Acampora U.S. Pat. No. 4,315,262, and to Assai, U.S. Pat. No. 4,868,886, describe spot beam satellite arrangements for use with point-to-point communication such as telephony. Acampora describes scanning spot beams over different parallel strip zones having similar traffic demands. Assai describes a system that can provide either a global beam or simultaneous global and spot beams. Neither one appears to be applicable to a high speed digital system which is required for digital television transmission to multiple population centers of various size by using non-uniform sized spot beams.

SUMMARY OF THE INVENTION

The present invention provides a new and improved, highly efficient system and method for satellite broadcast of local television and other types of service, either independently or together with larger regional broadcasts. Both bandwidth efficiency and communications link performance are significantly improved, with interference levels reduced for the most important service areas. It allows for a higher overall system throughput to a given geographic region, and is economically viable because of its increased capacity and accommodation of marketplace realities in those areas.

These advantages are achieved by broadcasting multiple spot beams from a spacecraft, such as a satellite, to different target areas in a non-uniform beam pattern, and providing at least some of the beams with different respective signal frequency bands. However, at least some of the beams have a common frequency band, and such beams are directed to non-overlapping target area locations to avoid excessive interference. Priorities are established among different target areas by assigning different sizes and powers to different beams, with the higher power beams accommodating larger signal capacity and also resulting in a lower interference level from other beams. The priorities among different target areas can also be set by the selection of antenna reflector sizes to produce different roll-off characteristics for different beams, and by varying the illumination tapers of different antenna feed horns to establish different peak-to-edge power differentials for different beams.

These and other features and advantages of the invention will be apparent to those skilled in the art from the following detailed description, taken together with the accompanying drawings.

BRIEF DESCRIPTION OF THE DRAWINGS

FIGS. 4a, 4b, 4c and 4d are diagrams of right and left hand circular polarized spot beam patterns for four different broadcast frequency bands in accordance with the invention, while

DETAILED DESCRIPTION OF THE INVENTION

Figure 2:
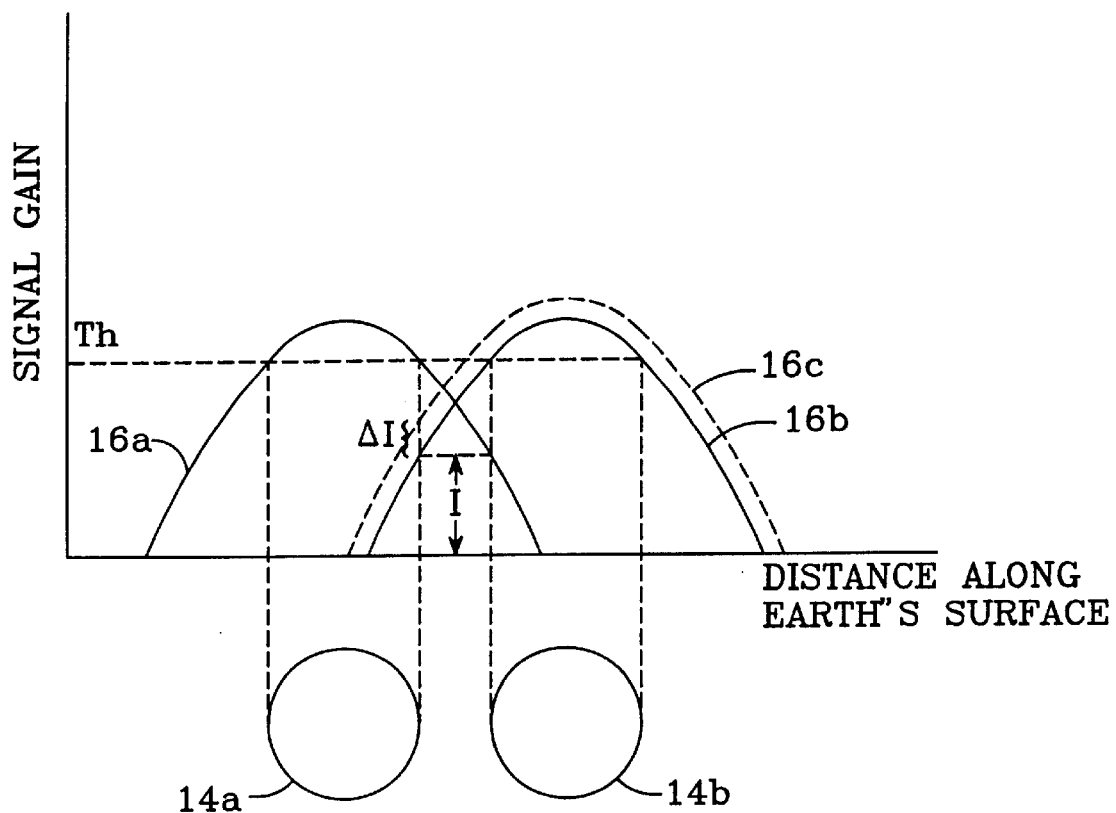
FIG. 2 is a graph illustrating possible interference between two separate beams carrying signals within a common frequency band.

A basic problem in providing local television service from satellite broadcasts is the possibility of interference between different beams that are directed to different service areas, but carry signals within the same frequency band. This problem is illustrated in FIG. 2, which depicts the signal gain as a function of location along the earth's surface for two beams 14a and 14b (see looking down from above) that are nominally spaced apart from each other at the earth's surface. Assuming an equal gain for each beam, their respective gain characteristics 16a and 16b follow generally parabolic lobes, extending down to the first nulls before sidelobe energy is created, well below the levels of concern. However, the signal gain within the useful portion of each beam as a practical matter must exceed a specific threshold level, designated Th in the drawing. The generally circular beam patterns 14a and 14b encompass the central portions of the overall beams, where the signal gain equals or exceeds Th. Thus, even though the useful beam contours 14a and 14b are shown as being separated from each other, lower gain peripheral roll-off portions of each beam may overlap into the other beam's target area. This is illustrated as occurring at signal gain level I, at which a lower gain portion of each beam crosses over into the target area of the other beam.

The effect of increasing the signal gain (power) for one of the beams, such as the right hand beam 14b, is also illustrated in FIG. 2. Assume for example that the peak power for the beam's original gain characteristic 16b is 40 dBi, but that the signal gain is then increased to gain characteristic 16c, with a peak gain of 43 dBi (which doubles its power). This increases the interference level of beam 14b crossing over into beam 14a by ΔI, but does not increase the interference level of beam 14a crossing over into beam 14b. Thus, increasing the carrier power C for the first beam degrades the carrier-to-interference (C/I) level for the second beam, whose power level remains constant but which suffers greater interference, but improves the C/I ratio for the first beam whose power has been increased because the interference it receives from the second beam remains constant.

Another important contributor to signal degradation is thermal noise N. Increasing a beam's power also increases the C/N ratio, since the thermal noise remains constant. Thus, increasing the power of one of the beams increases both the C/I and C/N ratios for that beam, while C/N for the other beam remains the same but its C/I ratio goes down because of increased interference from the first beam.

For satellite signal transmissions that are performed digitally, such as digital television, reductions in the C/N and C/I ratios are not perceived as a gradual degradation in the signal quality. Rather, because the system is received above a given threshold, higher relative noise and interference levels can increase the duration and frequency of total signal outages during rain, thunder storms or other bad weather conditions. The problem is not one of signal quality, which is always high for a digital system when the signal is received, but of the number and duration of outages. In the past this has been addressed by spacing beams with different signals in the same frequency band so far apart that there is essentially no overlap between the beams, even in their peripheral areas.

The present invention takes a more flexible approach that allows for a much more efficient utilization of satellite capacity, and makes possible both high quality local and regional broadcast service. Rather than attempting to totally eliminate any degradation in signal quality at all, a non-uniformity is introduced into factors such as the beam sizes, distribution and powers, cross-beam interference levels, roll-off characteristics and peak-to-edge power differentials to allow the service to the most important areas to be optimized. While this can involve some sacrifice of service levels to marginal areas, the net result is to provide a higher degree of service (including local service) to a greater portion of the population. Efficiency is further improved by providing a high degree of frequency reuse, in which the same frequency bands can be used repeatedly for different local target areas. For purposes of this application the term "frequency band" is not limited to any particular governmentally pre-assigned frequency band, and refers more generally to any desired continuous frequency spectrum, not all of which must be occupied at any given time.

Figure 1:
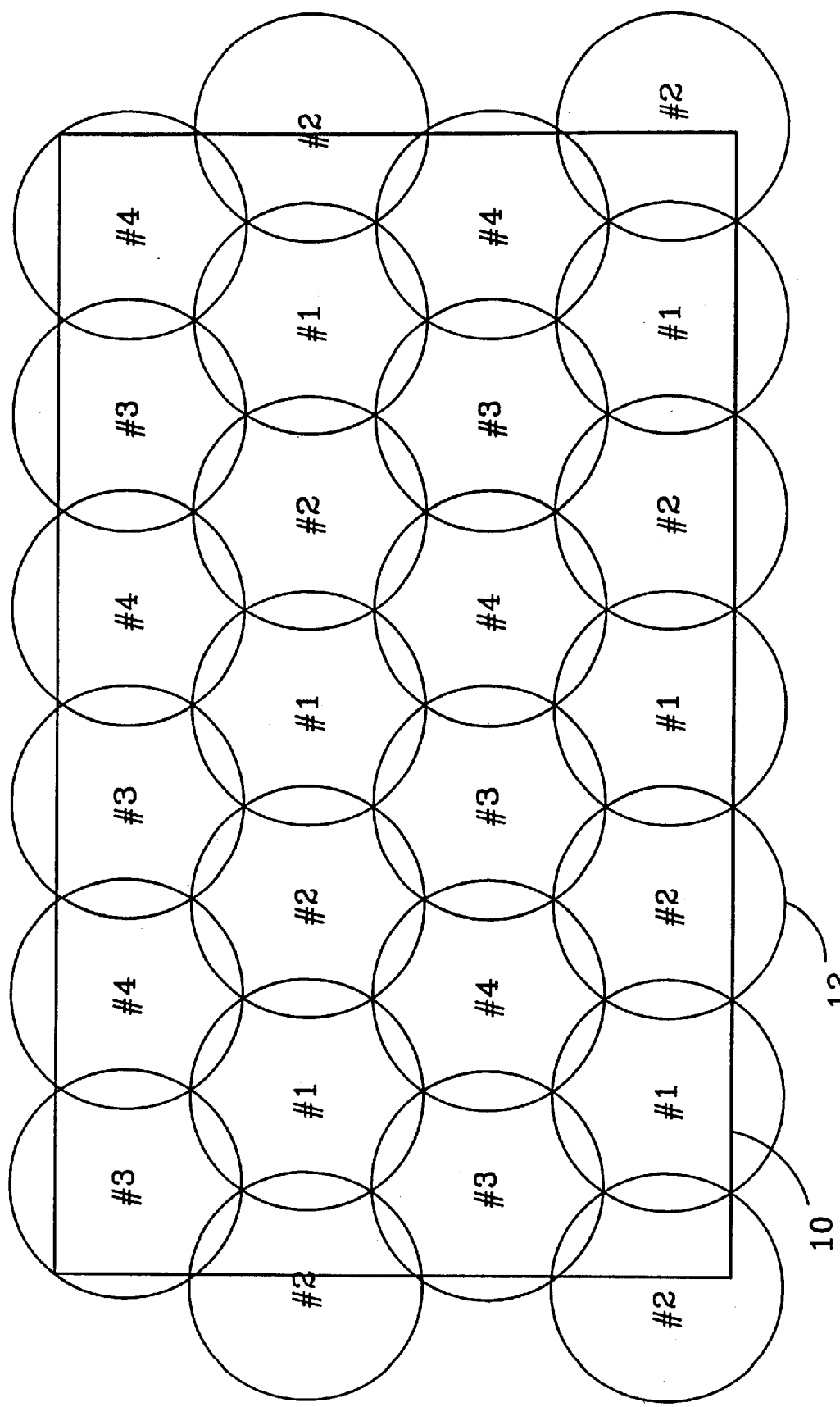
FIG. 1, discussed above, is a conceptual diagram of a prior regional satellite broadcast coverage with a uniform pattern of overlapping beams.
Figure 3:
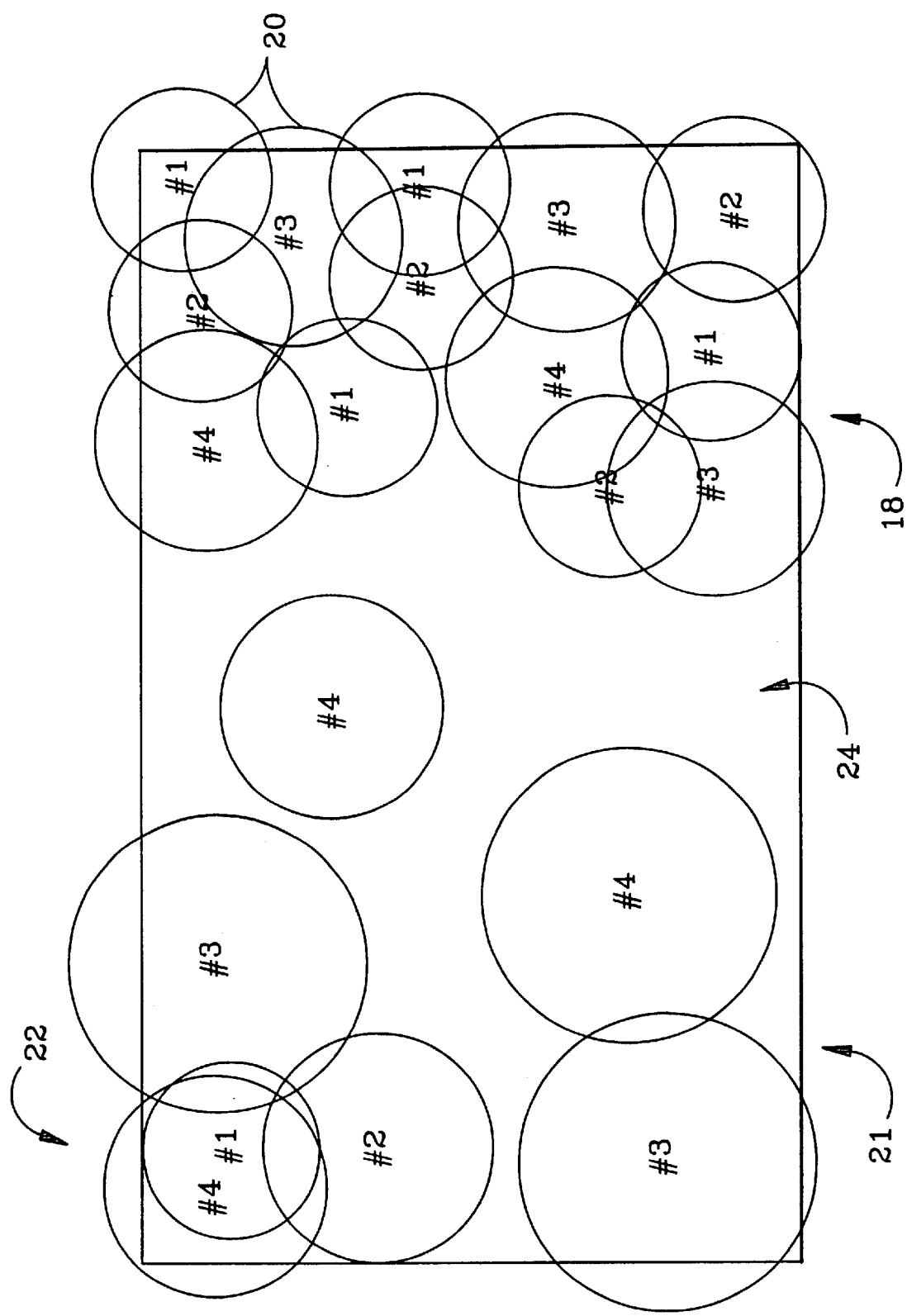
FIG. 3 is a conceptual diagram of a non-uniform spot beam pattern used to enhance broadcast efficiency in accordance with the invention.

The non-uniform beam size and distribution aspects of the invention are illustrated in FIG. 3, in which target areas for signals within four different frequency bands are again designated by numbers 1, 2, 3 and 4. However, in contrast to the prior uniform pattern of FIG. 1, the invention concentrates the beams on the areas of highest population, with the highest density of local service areas generally having the highest density of beams. The beam sizes are tailored to each service area, with the regions of highest population density generally assigned more but smaller beams to allow for a greater number of different local service areas with relatively high power levels for each local area.

The right hand side 18 of FIG. 3 illustrates a region of closely spaced and high density population centers, with a separate local service beam 20. for each local service area. Beams with different frequency bands can overlap in this region to assure that each local service area is fully covered. Different beams can also vary in size, with the smaller beams generally serving local services areas with higher population densities. As with the prior uniform beam pattern illustrated in FIG. 1, beams which operate at the same frequency band are preferably spaced apart from each other. However, they do not have to be spaced so far apart that cross-beam interference is totally eliminated. Rather, to increase the satellite's frequency reuse and broadcast to a greater number of local service areas, some overlap of a peripheral portion of one beam into the intended target area for another beam with the same frequency band is permissible. In this situation the beam power for the target area having the higher priority, which will generally be the area with the larger number of customers, can be set higher than the power level of the beam which it overlaps.

The left hand region 21 of FIG. 3 illustrates a possible beam distribution for a region with fewer population centers that are more widely spaced and have lower population densities. The beam sizes are generally large than in the higher density region 18, and there are fewer beams for the same area. Note, however, that the new system can accommodate local variations within an overall region, such as the higher population density center 22 at the upper left hand corner of the figure, which is served by a greater density of beams having somewhat smaller average sizes than for the remainder of the overall region 20.

Gaps can be left between the beam coverage areas, and no local service provided at all, in a region 24 of low population density without significant population centers. While the idea of leaving some regions without any local service at all may be counter-intuitive, the actual result is to provide high quality local service to a large majority of the overall population because of the more efficient use of the satellite's resources, and is a great improvement over the prior inability to provide local satellite television service anywhere.

Figure 4A:
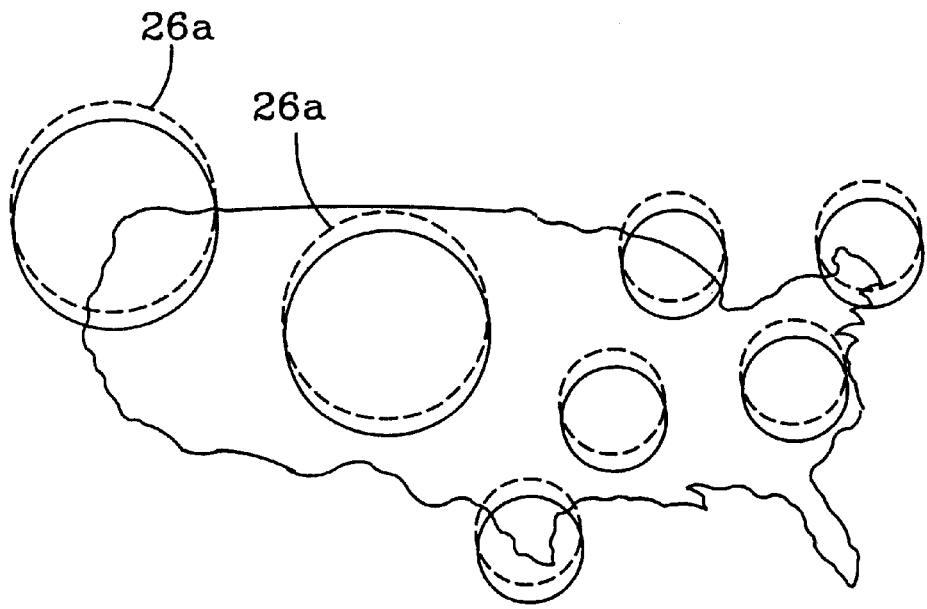
Figure 5A:
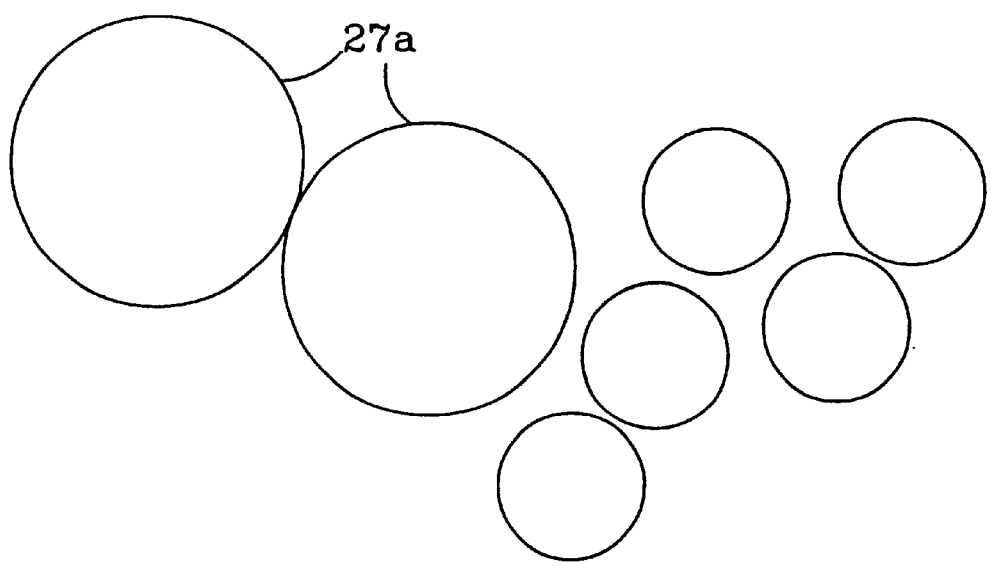
FIGS. 5a, 5b, 5c and 5d are diagrams of antenna feed horn layouts that can produce the spot beam patterns of FIGS. 4a, 4b, 4c and 4d, respectively.

FIGS. 4a–4d illustrate how local television service can be provided to the United States through the reuse of four different frequency bands, while FIGS. 5a–5d illustrate antenna feed horn layouts that can be used to produce the spot beam patterns of FIGS. 4a–4d, respectively. Both left and right hand circular polarization patterns are shown, and indicated respectively by dashed and solid lines. FIG. 4a illustrates seven beam target areas 26a, all with the same frequency band and distributed over different portions of the country, while FIG. 5a illustrates a pattern of feed horns 27a that can be used to produce the desired beam pattern from an antenna. Some cross-beam interference can be expected between such areas, as explained previously. The relative beam powers are designed to produce an optimum tradeoff between the number and durations of outages and the number of customers served in each area.

Figure 4B:
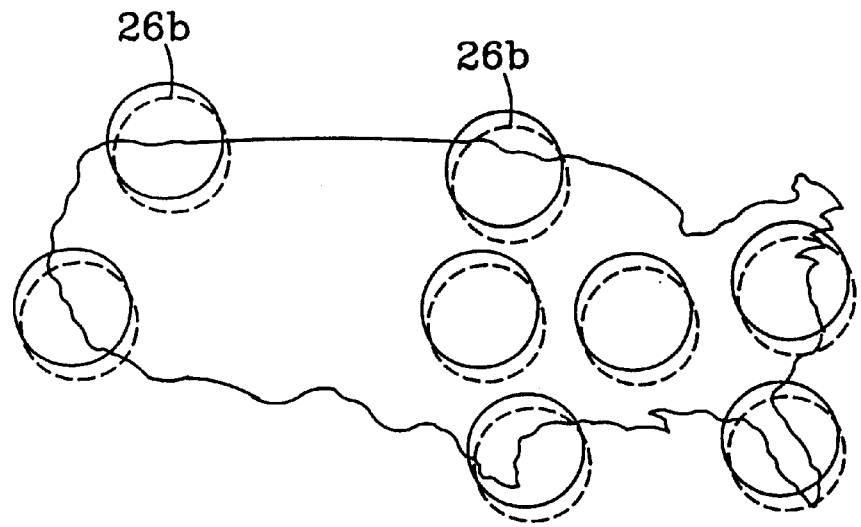
Figure 5B:
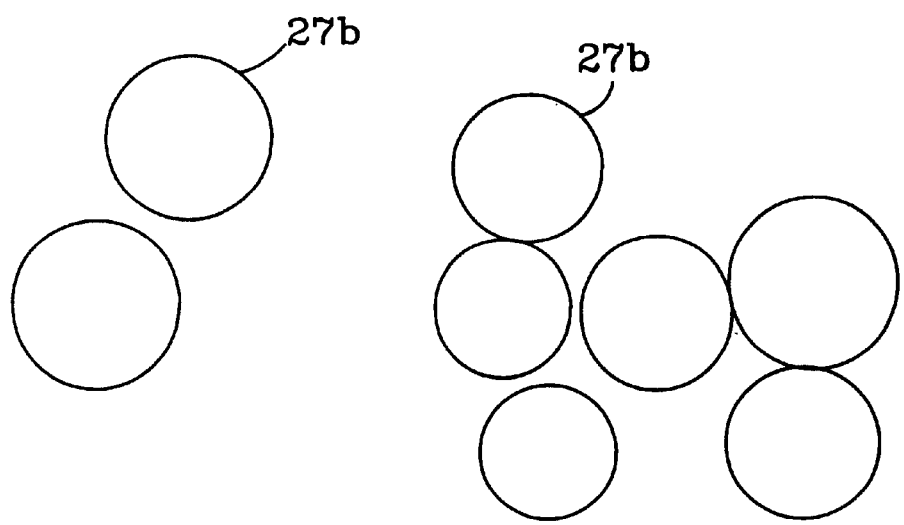
Figure 4C:
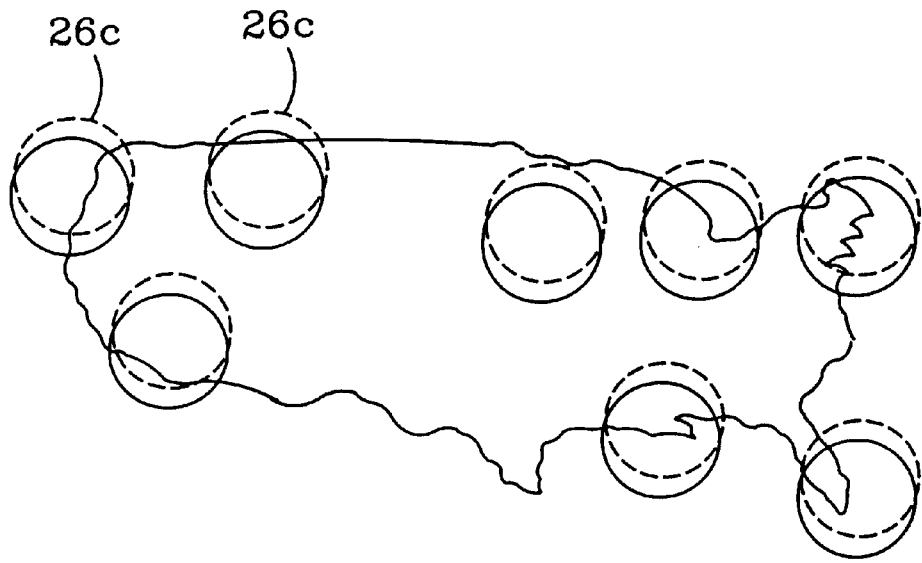
Figure 5C:
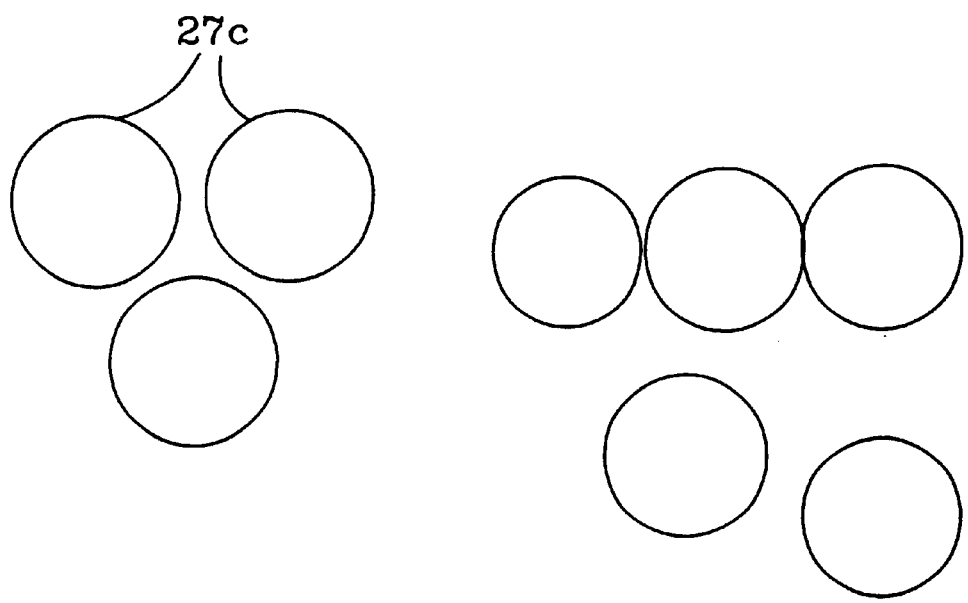
Figure 4D:
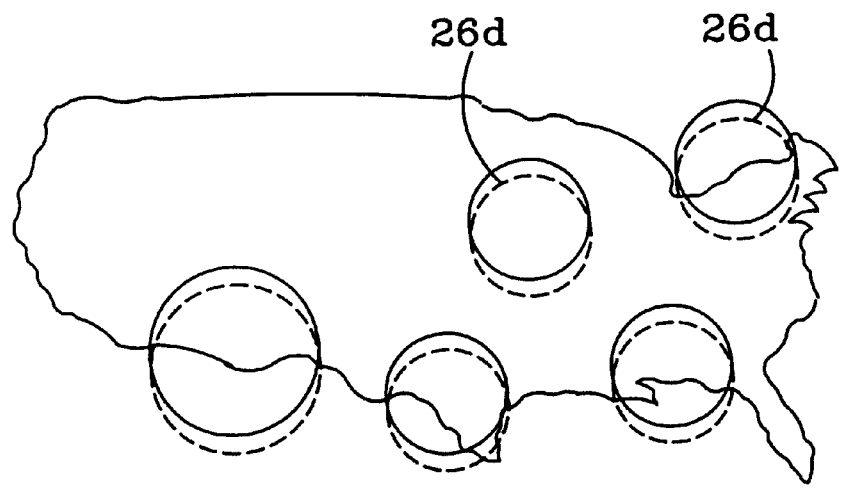
Figure 5D:
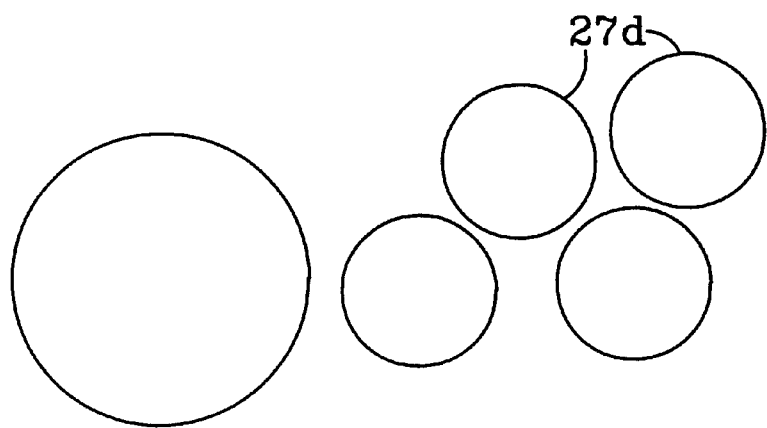
Figure 4E:
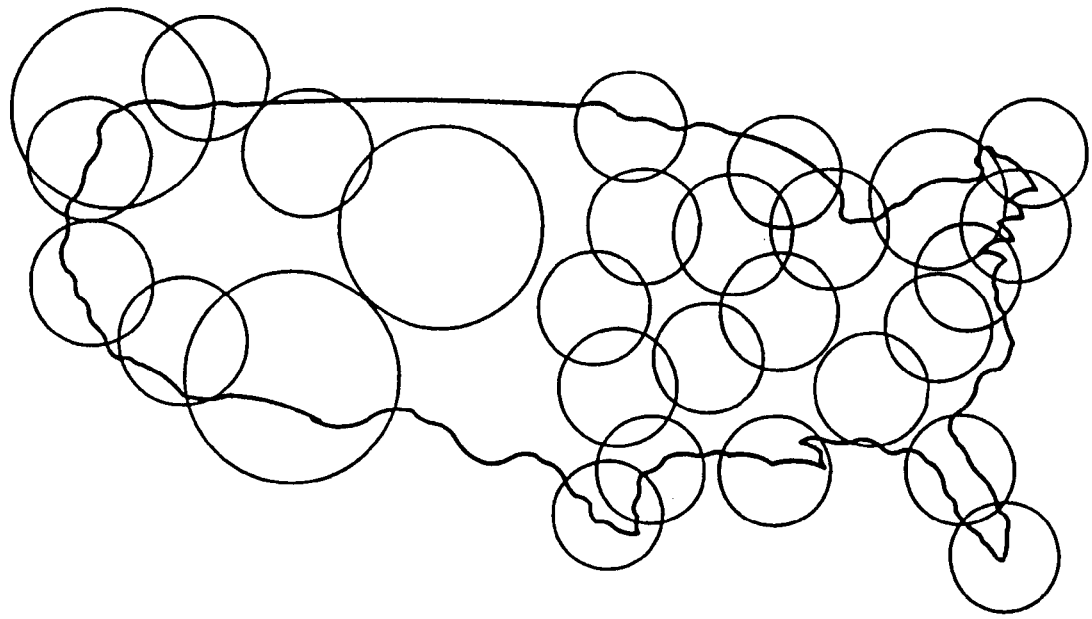
FIG. 4e is a diagram of the overall beam coverage produced by the spot beam patterns of FIGS. 4a, 4b, 4c and 4d, all superimposed on a map of the United States.

Target areas for the three other frequency bands, designated 26b, 26c and 26d in FIGS. 4b, 4c and 4d, respectively, are assigned in a similar manner, with corresponding patterns of feed horns 27b, 27c and 27d shown respectively in FIGS. 5b, 5c and 5d. The cumulative beam pattern produced on the ground by all four sets of beam target areas is illustrated in FIG. 4e. The target area for one frequency band can overlap with target areas for one or more different frequency bands; a target area for one band can encompass one or more smaller areas of different bands, or can be included within a larger area of a different band. Cross-beam interference is not a concern in this case because the different frequency bands do not overlap.

The beams illustrated in FIG. 4e all have circular cross-sections. While this would be most typical, shaped beams can also be produced by using a shaped antenna reflector on the satellite with a single antenna feed horn, or less desirably by providing the same signal to multiple feed horns for the same reflector with proper amplitude and phase relationships to achieve the desired shape. Shaped beams may be useful in ertain situations, such as broadcasting to a non-circular target area that is quite distant from the other beams. For example, Hawaii and Alaska could be good candidates for elliptical beams.

Figure 6:
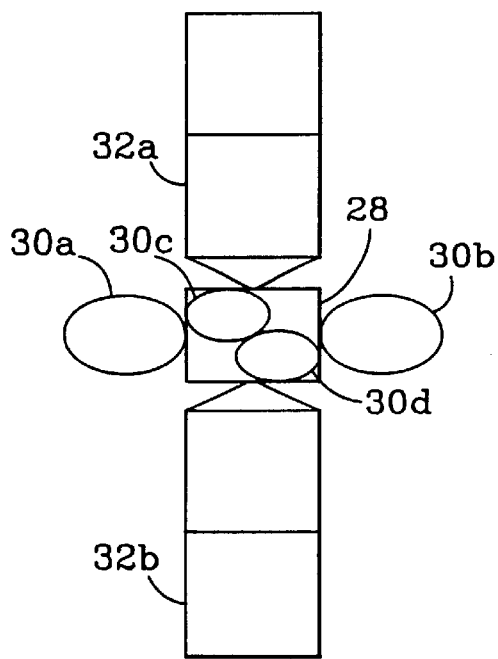
FIG. 6 is an elevation view of a satellite with different sized antenna reflectors for generating different sized spot beams.

FIG. 6 illustrates in simplified form a satellite 28 with an array of antennas designed to implement the invention. The satellite is shown carrying four different broadcast antenna reflectors 30a, 30b, 30c and 30d, with solar cells mounted on panels 32a and 32b providing a power supply for the system. Reflectors 30a and 30b are larger than reflectors 30c and 30d and, with appropriate feed horns, can produce the beam distributions shown in FIGS. 4b and 4c, respectively; with appropriate feed horns reflectors 30c and 30d can produce the beam distributions respectively shown in FIGS. 4a and 4d.

Figure 7:
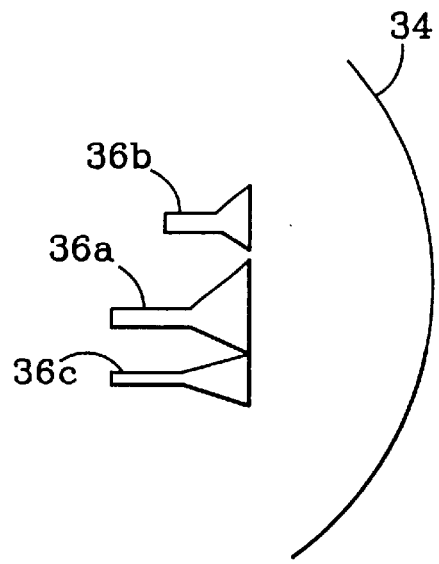
FIG. 7 is a simplified sectional view of one of the reflectors shown in FIG. 6, together with feed horns having different sizes and illumination tapers to produce different beam characteristics.

FIG. 7 gives a simplified view of a reflector 34 which reflects feed beams from a number of feed horns 36a, 36b and 36c; all of the feed horns for a single reflector would normally be operated within the same frequency band for a given signal polarization. The size of each beam is primarily a function of the reflector and horn dimensions, while the beam direction is a function of the reflector orientation relative to ground and the feed horn orientations relative to the reflector. However, given a fixed common reflector size for several feed horns, differences in horn sizes can be used to produce spot beams which have corresponding differences in size. Once a particular pattern of beam sizes and spatial distribution has been established, a specific reflector and feed horn design to implement the pattern involves merely an application of conventional antenna design principals.

The size of each reflector also determines the roll-off characteristics of its beams, which is an important factor in deter-mining the C/I ratio for beams broadcast with the same frequency band. In general, larger reflectors will produce better roll-off characteristics but will not be as easy to fit on the satellite, whereas smaller reflectors allow for a greater total number of reflectors for a given satellite and a potentially closer spacing between beams with the same frequency band, but will produce a degraded roll-off for a given feed horn type. The use of different size reflectors as illustrated in FIG. 6 thus results in different beams having different roll-off characteristics and adds another variable to the tradeoffs involved in providing the highest quality service to the greatest number of customers. In general, larger reflectors can be assigned to the more important local service areas to provide better beam roll-off characteristics in those areas.

The use of different feed horn sizes to produce different beam sizes from the same reflector is illustrated by feed horns 36a and 36b, which have different schematic representations. Because of their different positions relative to the reflector 34, feed horns 36a and 36b will also result in beams that are directed to different local target areas.

Another factor that affects service quality is the beam's peak-to-edge gain differential between the center and edge of the service area. The smaller the differential, the higher will be the signal quality towards the edges of the service area, but the overall power consumption will also increase. On the other hand, a higher differential means that the beam power is falling more rapidly at the edge of its target area, and is thus less likely to interfere with nearby beams. This is another way in which the different service areas can be prioritize, with the more important areas served by feed horns with illumination tapers that produce the lowest peak-to-edge gain differentials.

Another reason for assigning higher power levels to the beams that are broadcast to the more important service areas is that it allows for a larger number of station signals to be included within the frequency bands broadcast to those areas. To the first order, increasing the number of station signals reduces the power per signal, thus increasing both relative thermal noise and cross-beam interference levels; an increase in total beam power can be used to compensate for these signal degradations.

Figures 8, 9A, 9B:
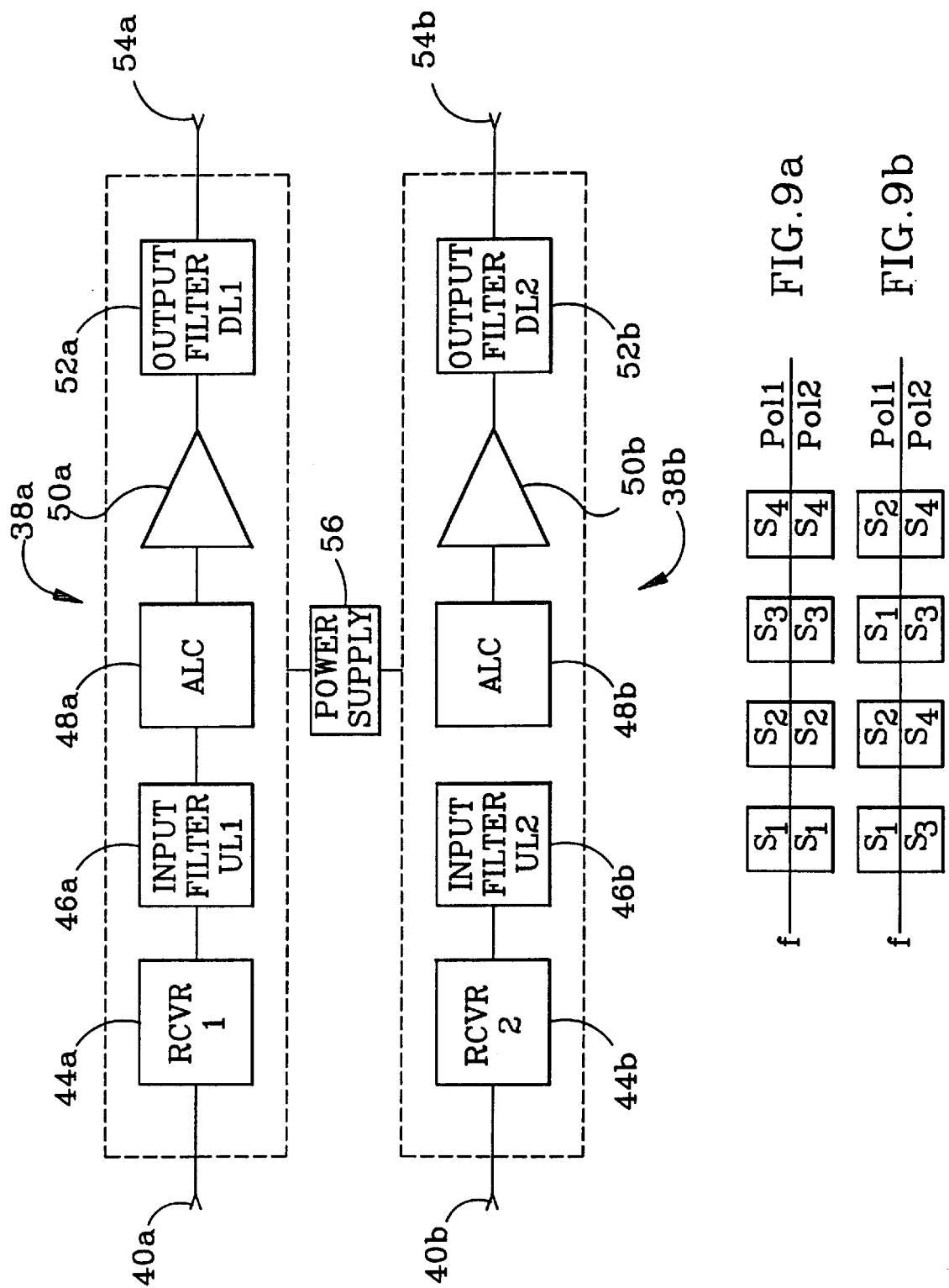
FIG. 8 is a block diagram of satellite circuitry that can be used to produce beams with different power levels from different antennas.
FIGS. 9a and 9b are frequency diagrams illustrating two possible frequency polarization-segmentation schemes that can be employed for four antenna reflectors broadcasting two channels per reflector.

FIG. 8 illustrates the satellite circuitry used to generate the different beams, with the circuitry for two channels 38a and 38b shown. Channel 38a receives a ground signal via uplink antenna 40a. The signal is delivered to a receiver 44a, which includes a low noise amplifier and a frequency converter that converts the uplink frequency band UL1 to a desired downlink frequency band DL1. An input channel filter 46a passes the desired channel, rejecting other channels. The resulting downlink channel signal is routed through an automatic level control (ALC) pre-amplifier 48*a* and a high power non-linear amplifier (typically a traveling wave tube or a solid state device) 50*a*. The amplified output is filtered by an output channel filter 52*a*, which passes the amplified channel band and blocks other unwanted frequencies, and then delivered to the feed horn of a downlink antenna 54*a*. Power is supplied to the channel circuitry from an on-board power supply 56, conventionally solar cells on the satellite panels 32*a* and 32*b* illustrated in FIG. 6.

The second channel has a similar configuration, with its own uplink antenna 40*b*, receiver 44*b* which performs an uplink (UL2)-to-downlink (DL2) frequency conversion, input channel filter 46*b* which passes the desired second channel and rejects other channels, ALC 48*b*, power amplifier 50*b*, output channel filter 52*b* which passes the amplified channel downlink frequency band and rejects other channels, and another antenna feed horn 54*b*. To reduce the total number of power amplifiers required, the signals for multiple lower power beams can be processed by a common power amplifier as described in U.S. patent application Ser. No. 60/062,005, filed on the same day as this application by John L. Norin and entitled "Method and Apparatus for Spacecraft Amplification of Multi-Channel Signals", the contents of which application is incorporated herein by reference. To compensate for variances between actual and designed beam power profiles, changes in the relative importance of different service areas over time, and changes in the number of station signals broadcast to a given target area, the amplifier drives can be adjusted from the ground as described in U.S. patent application Ser. No. 60/062,003, filed on the same day as this application by John L. Norin and entitled "Dynamic Interference Optimization Method for Satellites Transmitting Multiple Beams With a Common Frequency Channel", the contents of which application are also incorporated herein by reference.

Assuming that channel 38*a* is allocated to a more important local service area than channel 38*b*, its high power amplifier 50*a* will normally be selected to produce a greater power output than amplifier 50*b* in channel 38*b*. This is indicated in FIG. 8 by a larger amplifier symbol for 50*a* than for 50*b*.

At present, 32 transponder channels are typical for satellite television broadcasts in a given service, representing 16 different channels 24 MHz wide and separated by approximately 5 MHz, and two orthogonal polarizations (either left and right hand circular or vertical and horizontal) for each frequency band. In the preferred system the majority of the available channels are used for nationwide broadcasts, with the remaining channels reserved for local service beams. FIGS. 9*a* and 9*b* illustrate two possible schemes for dividing eight channels among four different reflectors, with the four different frequency bands indicated respectively by S1, S2, S3 and S4. In FIG. 9*a* each reflector broadcasts two signals of opposite polarization (POL1 and POL2) but within the same frequency band. In FIG. 9*b* each reflector broadcasts a signal within one frequency band at the first polarization, and another signal within a different frequency band at the second polarization.

While all of the beams would typically be broadcast from a single satellite, situations may arise that could lead to a distribution of the beams among multiple satellites. For example, where the desired feed size does not allow adjacent beams to use the same reflector surface to feed packaging interference, the greater antenna-to-antenna and satellite-to-satellite pointing differences normally associated with a multiple satellite system might be justified.

While particular embodiments of the invention have been shown and described, numerous variations and alternate embodiments will occur to those skilled in the art. Accordingly, it is intended that the invention be limited only in terms of the appended claims.

We claim:

1. A spacecraft antenna array for multi-beam broadcasts to earth, comprising:

a plurality of antenna reflectors, and at least one respective feed horn associated with each reflector, said antenna reflectors and their respective feed horns configured to broadcast a plurality of communication signal beams in a non-uniform beam pattern with at least first and second ones of said beams having different sizes and beam powers, a common frequency band, and spatially overlapping main lobes to produce and sustain a substantially greater non-zero cross-beam interference, relative to beam power, in a peripheral portion of the main lobe of said first beam than of said second beam.

2. A spacecraft broadcast system for multi-beam broadcasts to earth, comprising:

a spacecraft, a plurality of antenna reflectors with respective feed horns carried by said spacecraft, and a power supply and radio frequency (RF) signal circuitry carried by said spacecraft for energizing said feed horns to broadcast respective communication signal beams to respective target area locations on earth via their respective reflectors, said antenna reflectors and their respective feed horns configured to broadcast said beams in a non-uniform beam pattern with at least first and second ones of said beams having different sizes, a common frequency band, and spatially overlapping main lobes on earth to produce and sustain a substantially greater non-zero cross-beam interference, relative to beam power, in a peripheral portion of the main lobe of said first beam than of said second beam, said power supply and RF signal circuitry configured to energize said feed horns to broadcast said overlapping beams to produce different respective beam powers at their respective target area locations.

3. The spacecraft broadcast system of claim 2, wherein said power supply and RF signal circuitry energize said feed horns to broadcast at least some of said beams within different respective signal frequency spectrums.

4. The spacecraft broadcast system of claim 3, wherein said reflectors and feed horns are configured to broadcast at least some of said beams with different signal frequency spectrums to overlapping target area locations.

5. The spacecraft broadcast system of claim 2, wherein said reflectors and feed horns are configured to broadcast at least some of said beams with a common frequency band to non-overlapping target area locations.

* * * * *